(12) United States Patent
Pupovac

(10) Patent No.: US 11,174,384 B2
(45) Date of Patent: Nov. 16, 2021

(54) POLYCARBONATE COMPOSITION AND POLYCARBONATE MOLDING MATERIAL HAVING IMPROVED FLOWABILITY

(71) Applicant: Covestro Deutschland AG, Leverkusen (DE)

(72) Inventor: Kristina Pupovac, Düsseldorf (DE)

(73) Assignee: COVESTRO DEUTSCHLAND AG, Leverkusen (DE)

( * ) Notice: Subject to any disclaimer, the term of this patent is extended or adjusted under 35 U.S.C. 154(b) by 54 days.

(21) Appl. No.: 16/630,643

(22) PCT Filed: Aug. 1, 2018

(86) PCT No.: PCT/EP2018/070851
§ 371 (c)(1),
(2) Date: Jan. 13, 2020

(87) PCT Pub. No.: WO2019/025483
PCT Pub. Date: Feb. 7, 2019

(65) Prior Publication Data
US 2020/0157343 A1 May 21, 2020

(30) Foreign Application Priority Data

Aug. 4, 2017 (EP) .................................... 17184925

(51) Int. Cl.
| | | |
|---|---|---|
| *C08L 69/00* | (2006.01) | |
| *C08K 5/105* | (2006.01) | |
| *C08K 5/11* | (2006.01) | |
| *C08K 5/52* | (2006.01) | |
| *C08L 51/00* | (2006.01) | |
| *C08L 91/00* | (2006.01) | |

(52) U.S. Cl.
CPC ............ *C08L 69/005* (2013.01); *C08K 5/105* (2013.01); *C08K 5/11* (2013.01); *C08K 5/52* (2013.01); *C08L 51/003* (2013.01); *C08L 91/00* (2013.01); *C08L 2203/30* (2013.01); *C08L 2205/03* (2013.01)

(58) Field of Classification Search
CPC ...... C08L 69/00; C08L 69/005; C08L 51/003; C08L 51/04; C08L 57/02
See application file for complete search history.

(56) References Cited

U.S. PATENT DOCUMENTS

2003/0181603 A1  9/2003  Venderbosch et al.

OTHER PUBLICATIONS

International Search Report for International Patent Application No. PCT/EP2018/070851, dated Oct. 9, 2018. (English translation attached.)
Written Opinion for International Patent Application No. PCT/EP2018/070851, dated Oct. 9, 2018.

*Primary Examiner* — Jeffrey C Mullis
(74) *Attorney, Agent, or Firm* — K&L Gates LLP

(57) ABSTRACT

A composition for producing a thermoplastic moulding material, wherein the composition comprises the following components:
A) aromatic polycarbonate or polyestercarbonate,
B) rubber-modified vinyl (co)polymer,
C) a hydrocarbon resin containing aromatic and aliphatic structural units,
D) optionally further additives distinct from component C, wherein,
for component C, a ratio of an integrated peak area of an FTIR spectrum in a wavenumber range of 1630 cm-1 to 1560 cm-1 to an integrated peak area of an FTIR spectrum in a wavenumber range of 1520 cm-1 to 1350 cm-1 is in a range from $(80\text{-}160) \cdot 10^{-3}$.
A process for producing a moulding material, the moulding material itself, a process for producing injection-moulded or thermoformed moulded articles, and moulded articles obtainable from the composition or the moulding material.

17 Claims, No Drawings

POLYCARBONATE COMPOSITION AND POLYCARBONATE MOLDING MATERIAL HAVING IMPROVED FLOWABILITY

CROSS-REFERENCE TO RELATED APPLICATIONS

This application is a U.S. national stage application, filed under 35 U.S.C. § 371, of International Application No. PCT/EP2018/070851, which was filed on Aug. 1, 2018, and which claims priority to European Patent Application No. 17184925.0, which was filed on Aug. 4, 2017.

FIELD

The present invention relates to a polycarbonate composition for producing a thermoplastic moulding material, to a process for producing the thermoplastic moulding material, to the moulding material itself, to the use of the composition or moulding material for producing moulded articles and to the moulded articles themselves.

BACKGROUND

Polycarbonate compositions and moulding materials produced therefrom are used for a multiplicity of applications, for example for the motor vehicle sector, for the construction sector, for household appliances and for the electricals and electronics sectors. Through the choice of the components of the composition and the proportions thereof, the properties of the moulding materials and the produced components may be adapted to the relevant application within wide limits in respect of the rheological, thermal and mechanical properties.

A frequent challenge is the balance between the melt flowability of the moulding material and the mechanical properties of the finished components, in particular toughness. Thus, while it is possible in thermoplastic polycarbonate moulding materials to increase the melt flowability via a reduction in the molecular weight of the polycarbonate or a polymeric blend partner, this measure usually results in a reduction in toughness, in particular at low temperatures.

As an alternative, the use of additives for flow enhancing has often been described.

WO 2008/016814 discloses PC moulding materials having a combination of good chemicals resistance and scratch resistance. It is described that the chemicals resistance is not negatively affected by addition of a flow enhancer in the form of a hydrocarbon resin.

US 2003/0181603 describes PC compositions having a balance of good impact strength at room temperature, flowability, heat resistance and chemicals resistance. The compositions contain low molecular weight hydrocarbon resins as flow agents. An effect of the resins used on low-temperature toughness is not described.

US 2009/0312479 discloses talc-filled, flame retardant PC/ABS moulding materials which contain a low molecular weight hydrocarbon resin as a flow agent and feature an enhanced elastic modulus, impact behaviour and an improved flowability.

WO 2011/014778 discloses flame retardant, thermoplastic moulding materials made of polycarbonate and inorganic fillers which feature a higher elastic modulus but a poorer flowability. It is disclosed that addition of a low molecular weight flow agent has a positive effect on the flowability of these compositions while retaining the high elastic modulus, impact characteristics and good flame retardant properties.

US 2015/0183986 discloses flame retardant, mineral-filled PC compositions comprising low molecular weight hydrocarbon resin as a flow agent which exhibit good flame retardant properties, good toughness and stiffness in combination with good flowability.

EP 2 574 642 discloses flame retardant PC moulding materials containing ethylene-propylene-octene maleic anhydride copolymer which exhibit not only a good flowability but also a good impact resistance and a good chemicals resistance coupled with a UL94 V-0 classification at 1.5 mm.

WO 2017/005739 discloses impact-modified polycarbonate compositions containing a diglycerol ester as a flow auxiliary which feature good mechanical properties, very good rheological properties (easy flowing) and high heat resistance.

SUMMARY

However, the described moulding materials still do not provide a satisfactory balance of improved flowability without compromising low-temperature toughness.

It was therefore desirable to provide a composition for producing a thermoplastic moulding material in which the flowability is increased while simultaneously retaining the low-temperature toughness of the produced moulded articles.

It has been found that, surprisingly, the desired profile of properties is exhibited by a composition for producing a thermoplastic moulding material, wherein the composition contains or consists of the following constituents:

A) aromatic polycarbonate or polyestercarbonate,
B) rubber-modified vinyl (co)polymer,
C) a hydrocarbon resin containing aromatic and aliphatic structural units,
D) optionally further additives distinct from component C, characterized in that for component C the ratio of the integrated peak area of the FTIR spectrum in the wavenumber range 1630 cm-1 to 1560 cm-1 to the integrated peak area of the FTIR spectrum in the wavenumber range 1520 cm-1 to 1350 cm-1 is in the range from $(80\text{-}160) \cdot 10^{-3}$, preferably $(90\text{-}150) \cdot 10^{-3}$, particularly preferably $(100\text{-}130) \cdot 10^{-3}$.

In a preferred embodiment the composition contains the following constituents:

A) 40% to 90% by weight, more preferably 50% to 85% by weight, particularly preferably 60% to 80% by weight, of aromatic polycarbonate or polyestercarbonate,
B) 5% to 50% by weight, more preferably 10% to 45% by weight, more particularly preferably 15% to 35% by weight, of rubber-modified vinyl (co)polymer,
C) 0.5% to 15% by weight, more preferably 1% to 12% by weight, particularly preferably 2% to 8% by weight, of a hydrocarbon resin containing aromatic and aliphatic structural units,
D) 0% to 20% by weight, more preferably 0.1% to 15% by weight, particularly preferably 0.2% to 10% by weight, of further additives distinct from component C, characterized in that for component C the ratio of the integrated peak area of the FTIR spectrum in the wavenumber range 1630 cm-1 to 1560 cm-1 to the integrated peak area of the FTIR spectrum in the wavenumber range 1520 cm-1 to 1350 cm-1 is in the range from $(80\text{-}160) \cdot 10^{-3}$, more preferably $(90\text{-}150) \cdot 10^{-3}$, particularly preferably $(100\text{-}130) \cdot 10^{-3}$.

It was moreover desirable for the moulding material to have a low susceptibility toward hydrolytic polymer degradation.

DETAILED DESCRIPTION

Component A

Polycarbonates in the context of the present invention include not only homopolycarbonates but also copolycarbonates and/or polyestercarbonates; the polycarbonates may be linear or branched in a known manner. According to the invention, it is also possible to use mixtures of polycarbonates.

The weight-average molecular weight $M_w$ of the aromatic polycarbonates and polyestercarbonates is in the range from 15 000 to 35 000 g/mol, preferably in the range from 20 000 to 33 000 g/mol, more preferably 23 000 to 31 000 g/mol, determined by GPC (gel permeation chromatography in methylene chloride using polycarbonate standard).

A portion, up to 80 mol %, preferably from 20 mol % to 50 mol %, of the carbonate groups in the polycarbonates used in accordance with the invention may have been replaced by aromatic dicarboxylic ester groups. Such polycarbonates, which contain both acid radicals of carbonic acid and acid radicals of aromatic dicarboxylic acids incorporated into the molecular chain, are referred to as aromatic polyestercarbonates. In the context of the present invention, they are covered by the umbrella term of thermoplastic aromatic polycarbonates.

The polycarbonates are produced in a known manner from diphenols, carbonic acid derivatives, optionally chain terminators and optionally branching agents, and for the production of the polyestercarbonates a portion of the carbonic acid derivatives is replaced by aromatic dicarboxylic acids or derivatives of the dicarboxylic acids according to the extent to which the carbonate structural units are to be replaced by aromatic dicarboxylic ester structural units in the aromatic polycarbonates.

Dihydroxyaryl compounds suitable for producing polycarbonates include those of formula (1)

$$HO—Z—OH \quad (1),$$

in which

Z is an aromatic radical which has from 6 to 30 carbon atoms and may contain one or more aromatic rings, may be substituted and may contain aliphatic or cycloaliphatic radicals or alkylaryls or heteroatoms as bridging elements.

It is preferable when Z in formula (1) represents a radical of formula (2)

in which $R^6$ and $R^7$ independently of one another represent H, $C_1$- to $C_{18}$-alkyl-, $C_1$- to $C_{18}$-alkoxy, halogen such as Cl or Br or respectively optionally substituted aryl or aralkyl, preferably H or $C_1$- to $C_{12}$-alkyl, particularly preferably H or $C_1$- to $C_8$-alkyl and very particularly preferably H or methyl, and X represents a single bond, —$SO_2$—, —CO—, —O—, —S—, $C_1$- to $C_6$-alkylene, $C_2$- to $C_5$-alkylidene or $C_5$- to $C_6$-cycloalkylidene which may be substituted by $C_1$- to $C_6$-alkyl, preferably methyl or ethyl, or else represents $C_6$- to $C_{12}$-arylene which may optionally be fused to further aromatic rings containing heteroatoms.

It is preferable when X represents a single bond, $C_1$- to $C_5$-alkylene, $C_2$- to $C_5$-alkylidene, $C_5$- to $C_6$-cycloalkylidene, —O—, —SO—, —CO—, —S—, —$SO_2$— or a radical of formula (3a)

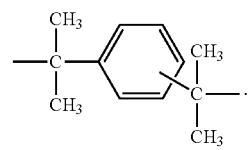

Examples of dihydroxyaryl compounds (diphenols) are: dihydroxybenzenes, dihydroxydiphenyls, bis(hydroxyphenyl)alkanes, bis(hydroxyphenyl)cycloalkanes, bis(hydroxyphenyl)aryls, bis(hydroxyphenyl) ethers, bis(hydroxyphenyl) ketones, bis(hydroxyphenyl) sulfides, bis(hydroxyphenyl) sulfones, bis(hydroxyphenyl) sulfoxides, 1,1'-bis(hydroxyphenyl)diisopropylbenzenes and the ring-alkylated and ring-halogenated compounds thereof.

Diphenols suitable for producing the polycarbonates for use in accordance with the invention are for example hydroquinone, resorcinol, dihydroxydiphenyl, bis(hydroxyphenyl)alkanes, bis(hydroxyphenyl)cycloalkanes, bis(hydroxyphenyl) sulfides, bis(hydroxyphenyl) ethers, bis(hydroxyphenyl) ketones, bis(hydroxyphenyl) sulfones, bis(hydroxyphenyl) sulfoxides, α,α'-bis(hydroxyphenyl)diisopropylbenzenes and the alkylated, ring-alkylated and ring-halogenated compounds thereof.

Preferred diphenols are 4,4'-dihydroxydiphenyl, 2,2-bis(4-hydroxyphenyl)-1-phenylpropane, 1,1-bis(4-hydroxyphenyl)phenylethane, 2,2-bis(4-hydroxyphenyl)propane, 2,4-bis(4-hydroxyphenyl)-2-methylbutane, 1,3-bis[2-(4-hydroxyphenyl)-2-propyl]benzene (bisphenol M), 2,2-bis(3-methyl-4-hydroxyphenyl)propane, bis(3,5-dimethyl-4-hydroxyphenyl)methane, 2,2-bis(3,5-dimethyl-4-hydroxyphenyl)propane, bis(3,5-dimethyl-4-hydroxyphenyl) sulfone, 2,4-bis(3,5-dimethyl-4-hydroxyphenyl)-2-methylbutane, 1,3-bis[2-(3,5-dimethyl-4-hydroxyphenyl)-2-propyl]benzene and 1,1-bis(4-hydroxyphenyl)-3,3,5-trimethylcyclohexane (bisphenol TMC).

Particularly preferred diphenols are 4,4'-dihydroxydiphenyl, 1,1-bis(4-hydroxyphenyl)phenylethane, 2,2-bis(4-hydroxyphenyl)propane, 2,2-bis(3,5-dimethyl-4-hydroxyphenyl)propane, 1,1-bis(4-hydroxyphenyl)cyclohexane and 1,1-bis(4-hydroxyphenyl)-3,3,5-trimethylcyclohexane (bisphenol TMC).

Greatest preference is given to 2,2-bis(4-hydroxyphenyl)propane (bisphenol A).

These and other suitable diphenols are described for example in U.S. Pat. Nos. 2,999,835 A, 3,148,172 A, 2,991,273 A, 3,271,367 A, 4,982,014 A and 2,999,846 A, in German laid-open specifications 1 570 703 A, 2 063 050 A, 2 036 052 A, 2 211 956 A and 3 832 396 A1, in the French patent specification 1 561 518 A1, in the monograph by H. Schnell, "Chemistry and Physics of Polycarbonates", Interscience Publishers, New York 1964, pp. 28ff and pp. 102ff., and in D. G. Legrand, J. T. Bendler, "Handbook of Polycarbonate Science and Technology", Marcel Dekker New York 2000, pp. 72ff.

In the case of the homopolycarbonates, only one diphenol is used; in the case of copolycarbonates, two or more diphenols are used. The diphenols employed, similarly to all other chemicals and assistants added to the synthesis, may be contaminated with the contaminants from their own synthesis, handling and storage. However, it is desirable to use raw materials of the highest possible purity.

The monofunctional chain terminators required for molecular-weight regulation, for example phenols or alkylphenols, in particular phenol, p-tert-butylphenol, isooctylphenol, cumylphenol, chlorocarbonic esters thereof or acyl chlorides of monocarboxylic acids or mixtures of these chain terminators, are either supplied to the reaction with the bisphenolate(s) or else are added at any desired juncture in the synthesis provided that phosgene or chlorocarbonic acid end groups are still present in the reaction mixture or, in the case of acyl chlorides and chlorocarbonic esters as chain terminators, as long as sufficient phenolic end groups of the resulting polymer are available. However, it is preferable when the chain terminator(s) is/are added after the phosgenation at a location or at a juncture at which phosgene is no longer present but the catalyst has not yet been metered into the system or when they are metered into the system before the catalyst or together or in parallel with the catalyst.

Any branching agents or branching agent mixtures to be used are added to the synthesis in the same way, but typically before the chain terminators. Compounds typically used are trisphenols, quaterphenols or acyl chlorides of tri- or tetracarboxylic acids, or else mixtures of the polyphenols or of the acyl chlorides.

Some of the compounds having three or more than three phenolic hydroxyl groups that are usable as branching agents are, for example, phloroglucinol, 4,6-dimethyl-2,4,6-tri(4-hydroxyphenyl)hept-2-ene, 4,6-dimethyl-2,4,6-tri(4-hydroxyphenyl)heptane, 1,3,5-tris(4-hydroxyphenyl)benzene, 1,1,1-tri(4-hydroxyphenyl)ethane, tris(4-hydroxyphenyl)phenylmethane, 2,2-bis[4,4-bis(4-hydroxyphenyl)cyclohexyl]propane, 2,4-bis(4-hydroxyphenylisopropyl)phenol, tetra(4-hydroxyphenyl)methane.

Some of the other trifunctional compounds are 2,4-dihydroxybenzoic acid, trimesic acid, cyanuric chloride and 3,3-bis(3-methyl-4-hydroxyphenyl)-2-oxo-2,3-dihydroindole.

Preferred branching agents are 3,3-bis(3-methyl-4-hydroxyphenyl)-2-oxo-2,3-dihydroindole and 1,1,1-tri(4-hydroxyphenyl)ethane.

The amount of branching agents for optional use is from 0.05 mol % to 2 mol %, in turn based on moles of diphenols used in each case.

The branching agents may either be initially charged with the diphenols and the chain terminators in the aqueous alkaline phase or added dissolved in an organic solvent before the phosgenation.

All of these measures for producing polycarbonates are familiar to those skilled in the art.

Aromatic dicarboxylic acids suitable for producing the polyestercarbonates are, for example, orthophthalic acid, terephthalic acid, isophthalic acid, tert-butylisophthalic acid, 3,3'-diphenyldicarboxylic acid, 4,4'-diphenyldicarboxylic acid, 4,4-benzophenonedicarboxylic acid, 3,4'-benzophenonedicarboxylic acid, 4,4'-diphenyl ether dicarboxylic acid, 4,4'-diphenyl sulfone dicarboxylic acid, 2,2-bis(4-carboxyphenyl)propane, trimethyl-3-phenylindane-4,5'-dicarboxylic acid.

Among the aromatic dicarboxylic acids, particular preference is given to using terephthalic acid and/or isophthalic acid.

Derivatives of dicarboxylic acids include dicarbonyl dihalides and dialkyl dicarboxylates, in particular dicarbonyl dichlorides and dimethyl dicarboxylates.

Replacement of the carbonate groups by the aromatic dicarboxylic ester groups proceeds essentially stoichiometrically and also quantitatively and the molar ratio of the reaction partners is therefore also reflected in the final polyestercarbonate. The aromatic dicarboxylic ester groups can be incorporated either randomly or blockwise.

Preferred modes of production of the polycarbonates to be used according to the invention, including the polyestercarbonates, are the known interfacial process and the known melt transesterification process (cf. e.g. WO 2004/063249 A1, WO 2001/05866 A1, WO 2000/105867, U.S. Pat. Nos. 5,340,905 A, 5,097,002 A, 5,717,057 A).

In the first case the acid derivatives used are preferably phosgene and optionally dicarbonyl dichlorides; in the latter case preferably diphenyl carbonate and optionally dicarboxylic diesters.

Catalysts, solvents, workup, reaction conditions etc. for polycarbonate production/polyestercarbonate production are in both cases sufficiently described and known.

Component B

Component B is a rubber-modified vinyl (co)polymer.

Component B comprises one or more graft polymers as component B.1) and rubber-free vinyl (co)polymer not chemically bonded to a rubber or enclosed in this rubber as component B.2).

Component B.1)

Component B.1) comprises one or more graft polymers of

B.1.1 10% to 80% by weight, preferably 20% to 70% by weight, particularly preferably 25% to 55% by weight, of at least one vinyl monomer and B.1.2 20% to 90% by weight, preferably 30% to 80% by weight, particularly preferably 45% to 75% by weight of one or more rubber-like, preferably particulate, graft substrates, preferably having glass transition temperatures <10° C., more preferably <0° C., particularly preferably <−20° C., wherein the polymer chains formed from the monomers B.1.1) are chemically bonded to the graft substrate B.1.2) or are enclosed in the graft substrate such that during production and processing of the compositions according to the invention they do not escape from this graft substrate.

Glass transition temperature is determined by differential scanning calorimetry (DSC) according to the standard DIN EN 61006 (2004 version) at a heating rate of 10 K/min where Tg is defined as the mid-point temperature (tangent method).

The preferred particulate graft substrates B.1.2) generally have an average particle size (d50 value) of 0.05 to 10 μm, preferably 0.1 to 5 μm, particularly preferably 0.2 to 1.5 μm.

The median particle size d50 is the diameter above which and below which 50% by weight of the particles respectively lie. It can be determined by ultracentrifugation (W. Scholtan, H. Lange, Kolloid, Z. und Z. Polymere [polymers] 250 (1972), 782-1796).

Monomers B.1.1 are preferably mixtures of

B.1.1.1 50% to 99% by weight, preferably 65% to 85% by weight, preferably 70% to 80% by weight, in each case based on the entirety of the monomers of the graft sheath B.1.1, of vinylaromatics and/or ring-substituted vinylaromatics (such as styrene, α-methylstyrene, p-methylstyrene, p-chlorostyrene) and/or (C1-C8)-alkyl (meth)acrylates, such as methyl methacrylate, ethyl methacrylate and butyl acrylate, and B.1.1.2 1 to 50 wt %, preferably 15 to 35 wt %, particularly preferably 20 to 30 wt %, in each case based on the sum of the monomers of the graft sheath B.1.1, of vinyl cyanides (unsaturated nitriles such as acrylonitrile and methacrylonitrile) and/or (C1-C8)-alkyl (meth)acrylates, for example methyl methacrylate, n-butyl acrylate, t-butyl acrylate, and/or derivatives (such as anhydrides and imides) of unsaturated carboxylic acids, for example maleic anhydride and N-phenylmaleimide.

Preferred monomers B.1.1.1 are selected from at least one of the monomers styrene, α-methylstyrene and methyl methacrylate. Preferred monomers B.1.1.2 are selected from at least one of the monomers acrylonitrile, n-butyl acrylate, maleic anhydride and methyl methacrylate.

Particularly preferred monomers are B.1.1.1 styrene and B.1.1.2 acrylonitrile.

Graft substrates B.1.2 suitable for the graft polymers B.1) are for example diene rubbers, EP(D)M rubbers, i.e. those based on ethylene/propylene and optionally diene, acrylate, polyurethane, silicone, chloroprene, ethylene/vinyl acetate rubbers and also silicone/acrylate composite rubbers.

Preferred graft substrates B.1.2) are diene rubbers, for example based on butadiene and isoprene, or mixtures of diene rubbers or copolymers of diene rubbers or mixtures thereof with further copolymerizable monomers (for example according to B.1.1.1 and B.1.1.2).

Particularly preferred as graft substrate B.1.2) is pure polybutadiene rubber.

Particularly preferred graft polymers B.1) are for example ABS polymers as described for example in DE-A 2 035 390 (=U.S. Pat. No. 3,644,574) or in DE-A 2 248 242 (=GB-B 1 409 275), or in Ullmanns, Enzyklopadie der Technischen Chemie, Vol. 19 (1980), p. 280 et seq.

The graft copolymers B.1) are produced by free-radical polymerization, for example by emulsion, suspension, solution or bulk polymerization.

In a preferred embodiment component B.1) contains graft polymer produced by bulk polymerization.

The gel content of the graft substrate B.1.2) is determined at 25° C. in a suitable solvent as content insoluble in these solvents (M. Hoffmann, H. Krömer, R. Kuhn, Polymeranalytik I und II, Georg Thieme-Verlag, Stuttgart 1977).

As is well known, during grafting the graft monomers B.1.1) are not necessarily grafted onto the graft substrate completely. Products of grafting reactions thus often still contain significant proportions of free (i.e. not chemically bonded to the graft substrate and not irreversibly enclosed in the graft substrate) copolymer having a composition analogous to that of the graft sheath. In the context of the present invention component B.1) is to be understood as meaning exclusively the graft polymer as defined above while the copolymer not chemically bonded to the graft substrate and not enclosed in this graft substrate which is present as a consequence of manufacture is assigned to component B.2).

The proportion of this free copolymer in the products of grafting reactions may be determined from the gel contents thereof (proportion of free copolymer=100% by weight–gel content of the product in % by weight), wherein the gel content is determined at 25° C. in a suitable solvent (such as for instance acetone, M. Hoffmann, H. Krömer, R. Kuhn, Polymeranalytik I und II, Georg Thieme-Verlag, Stuttgart 1977) as content insoluble in these solvents.

It is preferable when the graft polymer composed of the components B.1.1 and B.1.2 has a core-shell structure, wherein component B.1.1 forms the shell (also described as a sheath) and component B.1.2 forms the core (see for example Ullmann's Encyclopedia of Industrial Chemistry, VCH-Verlag, Vol. A21, 1992, p. 635 and p. 656).

In a preferred embodiment component B.1) contains polybutadiene-containing rubber particles which have been grafted with the vinyl monomers B.1.1) and contain inclusions of vinyl (co)polymer made of the vinyl monomers B.1.1).

In a further preferred embodiment mixtures of various graft polymers B.1) are used in component B, wherein the graft polymers may differ for example in the mode of production and/or in the nature of the graft substrate B.1.2) and/or in the nature of the graft sheath B.1.1).

Component B.2)

The composition contains as further component B.2) one or more rubber-free (co)polymers of at least one vinyl monomer, preferably selected from the group of vinylaromatics, vinyl cyanides (unsaturated nitriles), (C1 to C8)-alkyl (meth)acrylates, unsaturated carboxylic acids and derivatives (such as anhydrides and imides) of unsaturated carboxylic acids.

Especially suitable as component B.2) are (co)polymers of

B.2.1) 50 to 99% by weight, preferably 65 to 85% by weight, more preferably 70 to 80% by weight, based on the (co)polymer B.2), of at least one monomer selected from the group of the vinylaromatics (for example styrene, α-methylstyrene), ring-substituted vinylaromatics (for example p-methylstyrene, p-chlorostyrene) and (C1-C8)-alkyl (meth) acrylates (for example methyl methacrylate, n-butyl acrylate, tert-butyl acrylate) and B.2.2) 1% to 50% by weight, preferably 15% to 35% by weight, more preferably 20% to 30% by weight, based on the (co)polymer B.2), of at least one monomer selected from the group of vinyl cyanides (for example unsaturated nitriles such as acrylonitrile and methacrylonitrile), (C1-C8)-alkyl (meth)acrylates (for example methyl methacrylate, n-butyl acrylate, tert-butyl acrylate), unsaturated carboxylic acids and derivatives of unsaturated carboxylic acids (for example maleic anhydride and N-phenylmaleimide).

These (co)polymers B.2) are resin-like, thermoplastic and rubber-free. Particular preference is given to the copolymer of B2.1) styrene and B2.2) acrylonitrile.

Such (co)polymers B.2) are known and can be prepared by free-radical polymerization, in particular by emulsion, suspension, solution or bulk polymerization.

The (co)polymers B.2) have a weight-average molecular weight (Mw) determined by gel permeation chromatography using a polystyrene standard of 50 000 to 200 000 g/mol, preferably of 70 000 to 170 000 g/mol, particularly preferably of 80 000 to 130 000 g/mol.

Component C

Employed as component C are low molecular weight hydrocarbon resins containing aromatic and aliphatic structural units.

The low molecular weight hydrocarbon resins are synthetic resins.

The synthetic hydrocarbon resins are produced by polymerization of aromatic (C9) hydrocarbons (for example byproducts from crude oil processing) or mixtures of such hydrocarbons. The C9 fraction comprises aromatic compounds such as indenes, methylstyrenes etc. The resins may also be partially hydrogenated.

The low molecular weight resins also contain proportions of aliphatic (C5) structural units. These too originate, for example, from crude oil production and comprise unsaturated olefins/diolefins such as pentenes, pentadienes and cyclic olefins/diolefins such as for example cyclopentenes, cyclopentadienes, dicyclopentadienes.

The hydrocarbon resins employed according to the invention feature a high proportion of aromatic structural units.

This proportion may suitably be characterized by Fourier-transform infrared spectroscopy (FTIR spectroscopy). The hydrocarbon resins employed according to the invention exhibit in the FTIR spectrum a ratio of the integrated peak area in the wavenumber range 1630 cm-1 to 1560 cm-1 to the integrated peak area of the FTIR spectrum in the wavenumber range 1520 cm-1 to 1350 cm-1 of $(80\text{-}160) \cdot 10^{-3}$, preferably $(90\text{-}150) \cdot 10^{-3}$, particularly preferably $(100\text{-}130) \cdot 10^{-3}$.

Hydrocarbon resins are thermoplastic, highly chemicals-resistant, in particular non-saponifiable, nonpolar oligomers or polymers having weight-average molar masses $M_w$ of preferably below 3000 g/mol, more preferably below 2000 g/mol, particularly preferably below 1000 g/mol.

The average molar masses of component C are determined by gel permeation chromatography (GPC) using a tetrahydrofuran (THF) eluent and a polystyrene standard.

The resins produced by polymerization of the (e.g. petroleum-derived) aromatic C9 fractions and aliphatic C5 fractions are well-known commercially under the name Picco™ (Eastman Chemical).

The resins preferably have softening points measured according to ASTM E 28 of 80-115° C., more preferably of 90-110° C.

Component D

The composition may further contain as component D commercially available additives, wherein suitable additives are in particular and preferably selected from the group consisting of flame retardants (for example organic phosphorus or halogen compounds, in particular bisphenol-A-based oligophosphate), anti-drip agents (for example compounds from the classes of fluorinated polyolefins, silicones, and also aramid fibres), flame retardant synergists (for example nanoscale metal oxides), smoke inhibitors (for example zinc borate), lubricants and demoulding agents (for example pentaerythritol tetrastearate), nucleating agents, antistats, conductivity additives, stabilizers (e.g. hydrolysis, heat-ageing and UV stabilizers, and also transesterification inhibitors and acid/base quenchers), flow promoters, compatibilizers, further impact modifiers distinct from component B (with or without core-shell structure), further polymeric constituents (for example functional blend partners), fillers and reinforcers (for example carbon fibres, glass fibres, talc, mica, kaolin, $CaCO_3$) and also dyes and pigments (for example titanium dioxide or iron oxide).

In a preferred embodiment the composition contains at least one polymer additive selected from the group consisting of lubricants and demoulding agents, stabilizers, flow promoters, phase compatibilizers, further impact modifiers, further polymeric constituents, dyes and pigments.

In a preferred embodiment the composition contains pentaerythritol tetrastearate as a demoulding agent.

In a preferred embodiment the composition contains as a stabilizer at least one representative selected from the group consisting of sterically hindered phenols, organic phosphites and sulfur-based co-stabilizers.

In a particularly preferred embodiment the composition contains as a stabilizer at least one representative selected from the group consisting of octadecyl 3-(3,5-di-tert-butyl-4-hydroxyphenyl)propionate and tris(2,4-di-tert-butylphenyl) phosphite.

In a particularly preferred embodiment the composition contains as component D) at least one representative selected from the group consisting of lubricants and demoulding agents, stabilizers, flow promoters and dyes and pigments and is free from other polymer additives of component D).

In a further preferred embodiment the composition contains as component D) at least one demoulding agent, at least one stabilizer and optionally at least one dye and/or one pigment and is free from further polymer additives of component D).

Production of the Moulding Materials and Moulded Articles

The compositions according to the invention can be used to produce thermoplastic moulding materials. The thermoplastic moulding materials according to the invention may be produced for example by mixing the respective constituents of the compositions and melt compounding and melt extruding the resulting mixture at temperatures of preferably 200° C. to 320° C., particularly preferably at 240° C. to 300° C., in customary apparatuses such as for example internal kneaders, extruders and twin-shaft screw systems in a known manner.

For the purposes of this application, this process is generally termed compounding.

The term moulding material is thus to be understood as meaning the product obtained when the constituents of the composition are melt-compounded and melt-extruded.

The mixing of the individual constituents of the compositions may be carried out in a known manner, either successively or simultaneously, either at about 20° C. (room temperature) or at a higher temperature. It is therefore possible by way of example that some of the constituents are metered into the system by way of the main intake of an extruder and that the remaining constituents are introduced subsequently in the compounding process by way of an ancillary extruder.

The invention also provides a process for producing the moulding materials according to the invention.

The moulding materials according to the invention may be used to produce moulded articles of any kind. These may be produced by injection moulding, extrusion and blow-moulding processes for example. A further form of processing is the production of moulded articles by deep drawing from previously produced sheets or films. The moulding materials according to the invention are particularly suitable for processing by extrusion, blow-moulding and deep drawing methods.

The constituents of the compositions may also be metered into an injection moulding machine or into an extrusion unit and processed into moulded articles directly.

Examples of such moulded articles that can be produced from the compositions and moulding materials according to the invention are films, profiles, housing parts of any type, for example for domestic appliances such as juice presses, coffee machines, mixers; for office machinery such as monitors, flatscreens, notebooks, printers, copiers; sheets, pipes, electrical installation ducts, windows, doors and other profiles for the construction sector (internal fitout and external applications), and also electrical and electronic components such as switches, plugs and sockets, and component parts for commercial vehicles, in particular for the automotive sector. The compositions and moulding materials according to the invention are also suitable for production of the following moulded articles or mouldings: internal fitout parts for rail vehicles, ships, aircraft, buses and other motor vehicles, bodywork components for motor vehicles, housings of electrical equipment containing small transformers, housings for equipment for the processing and transmission of information, housings and facings for medical equipment, massage equipment and housings therefor, toy vehicles for children, sheetlike wall elements, housings for safety equipment, thermally insulated transport containers, moulded parts for sanitation and bath equipment, protective grilles for ventilation openings and housings for garden equipment.

Further embodiments 1 to 21 of the present invention are described below:

1. Composition for producing a thermoplastic moulding material, wherein the composition contains the following constituents:
   A) aromatic polycarbonate or polyestercarbonate,
   B) rubber-modified vinyl (co)polymer,
   C) a hydrocarbon resin containing aromatic and aliphatic structural units,
   D) optionally further additives distinct from component C,
   characterized in that
   for component C the ratio of the integrated peak area of the FTIR spectrum in the wavenumber range 1630 cm-1 to 1560 cm-1 to the integrated peak area of the FTIR spectrum in the wavenumber range 1520 cm-1 to 1350 cm-1 is in the range from $(80-160) \cdot 10^{-3}$.

2. Composition according to embodiment 1, containing
   40% to 90% by weight of component A,
   5% to 50% by weight of component B,
   0.5% to 15% by weight of component C and
   0% to 20% by weight of component D.

3. Composition according to embodiment 1 or 2, wherein component A is bisphenol-A-based aromatic polycarbonate.

4. Composition according to any of the preceding embodiments, wherein component B contains polybutadiene-containing rubber particles which are grafted with vinyl monomers and which contain inclusions of vinyl (co)polymer made of the vinyl monomers.

5. Composition according to any of the preceding embodiments, wherein component B contains rubber-modified graft polymer produced in bulk polymerization.

6. Composition according to any of the preceding embodiments, wherein component C has a weight-average molecular weight Mw of below 3000 g/mol.

7. Composition according to any of the preceding embodiments, wherein component C has a softening point according to ASTM E 28 of 80-115° C.

8. Composition according to any of the preceding embodiments, wherein component C has a softening point according to ASTM E 28 of 90-110° C.

9. Composition according to any of the preceding embodiments, wherein for component C the ratio of the integrated peak area of the FTIR spectrum in the wavenumber range 1630 cm-1 to 1560 cm-1 to the integrated peak area of the FTIR spectrum in the wavenumber range 1520 cm-1 to 1350 cm-1 is in the range from $(90-150) \cdot 10^{-3}$.

10. Composition according to any of the preceding embodiments, wherein for component C the ratio of the integrated peak area of the FTIR spectrum in the wavenumber range 1630 cm-1 to 1560 cm-1 to the integrated peak area of the FTIR spectrum in the wavenumber range 1520 cm-1 to 1350 cm-1 is in the range from $(100-130) \cdot 10^{-3}$.

11. Composition according to any of the preceding embodiments, wherein component C has a weight-average molecular weight Mw of below 2000 g/mol.

12. Composition according to any of the preceding embodiments, wherein component C has a weight-average molecular weight Mw of below 1000 g/mol.

13. Composition according to any of the preceding embodiments, containing
   50% to 85% by weight of component A,
   10% to 45% by weight of component B,
   1% to 12% by weight of component C and
   0.1% to 15% by weight of component D.

14. Composition according to any of the preceding embodiments, containing
   60% to 80% by weight of component A,
   15% to 35% by weight of component B,
   2% to 8% by weight of component C and
   0.2% to 10% by weight of component D.

15. Composition according to any of the preceding embodiments, containing as component D at least one additive substance selected from the group comprising flame retardants, anti-drip agents, flame retardant synergists, smoke inhibitors, lubricants and demoulding agents, nucleating agents, antistats, conductivity additives, stabilizers, flow promoters, compatibilizers, further impact modifiers distinct from component B, further polymeric blend partners, fillers and reinforcers and also dyes and pigments.

16. Composition according to any of the preceding embodiments, wherein the composition consists solely of components A) to D).

17. Process for producing a moulding material, characterized in that the constituents of a composition according to any of embodiments 1 to 16 are mixed with one another at a temperature of 200° C. to 320° C.

18. Process according to embodiment 17, wherein the temperature is 240° C. to 300° C.

19. Moulding material obtained or obtainable by a process as claimed in either of embodiments 17 or 18.

20. Use of a composition according to any of embodiments 1 to 16 or of a moulding material according to embodiment 19 for producing injection-moulded or thermoformed moulded articles.

21. Moulded article obtainable from a composition according to any of embodiments 1 to 16 or from a moulding material according to embodiment 19.

Examples

Component A:
Bisphenol-A-based linear polycarbonate having a weight-average molar mass $M_w$ of 26 000 g/mol (determined by GPC in methylene chloride using a polycarbonate standard).

Component B:
Acrylonitrile-butadiene-styrene (ABS) polymer produced in the bulk polymerization process which contains a disperse phase of polybutadiene-containing rubber particles with inclusions of styrene-acrylonitrile copolymer and a styrene-acrylonitrile-copolymer matrix and has an A:B:S ratio of 23:10:67% by weight and a gel content determined as the fraction insoluble in acetone of 20% by weight. The free, i.e. acetone-soluble, styrene-acrylonitrile copolymer in component B has a weight-average molecular weight $M_w$ (measured by GPC in acetone as solvent with polystyrene standard) of 165 kg/mol. The median rubber particle size D50, measured by ultracentrifugation, is 0.85 μm. The melt volume flow rate (MVR) of component B, measured according to ISO 1133 at 220° C. with an applied load of 10 kg, is 6.7 ml/10 min.

Component C-1:
Kristallex™ F115 (Eastman): Mixture of monomeric aromatic hydrocarbon resins having a weight-average molecular weight $M_w$ of 2000 g/mol (determined by GPC using THF as eluent and a polystyrene standard). The ratio of the integrated peak area of the FTIR spectrum in the wavenumber range 1630 cm-1 to 1560 cm-1 to the integrated peak area of the FTIR spectrum in the wavenumber range 1520 cm-1 to 1350 cm-1 is $170 \cdot 10^{-3}$. The softening point according to ASTM E28 (2004 version) is 117° C.

Component C-2:

Picco™ AR100 (Eastman): Mixture of aromatic and aliphatic hydrocarbon resins having a weight-average molecular weight $M_w$ of 800 g/mol (determined by GPC using THF as eluent and a polystyrene standard). The ratio of the integrated peak area of the FTIR spectrum in the wavenumber range 1630 cm-1 to 1560 cm-1 to the integrated peak area of the FTIR spectrum in the wavenumber range 1520 cm-1 to 1350 cm-1 is $120 \cdot 10^{-3}$. The softening point according to ASTM E28 (2004 version) is 100° C.

Component C-3:

Arkon™ P-125 (Arakawa Europe GmbH): Fully hydrogenated alicyclic hydrocarbon resins having a weight-average molecular weight $M_w$ of 1400 g/mol (determined by GPC using THF as eluent and a polystyrene standard). The ratio of the integrated peak area of the FTIR spectrum in the wavenumber range 1630 cm-1 to 1560 cm-1 to the integrated peak area of the FTIR spectrum in the wavenumber range 1520 cm-1 to 1350 cm-1 is $20 \cdot 10^{-3}$. The softening point according to ASTM E28 (2004 version) is 125° C.

Component D:

Heat stabilizer, Irganox™ B900

(mixture of 80% Irgafos™ 168 (tris(2,4-di-tert-butylphenyl) phosphite) and 20% Irganox™ 1076 (2,6-di-tert-butyl-4-(octadecanoxycarbonylethyl)phenol) (BASF AG)

Component E:

Pentaerythritol Tetrastearate Lubricant/Demoulding Agent

Production and Testing of the Moulding Materials According to the Invention

The components were mixed in a ZSK-25 twin-screw extruder from Werner & Pfleiderer at a melt temperature of 260° C. The moulded articles were produced at a melt temperature of 260° C. and a mould temperature of 80° C. in an Arburg 270 E injection moulding machine.

Melt viscosity was determined according to ISO 11443 (2014 version) at a temperature of 260° C. and a shear rate of 1000 s$^{-1}$.

The melt volume flow rate (MVR) was determined according to ISO 1133 (2012 version) at 260° C. using an applied load of 5 kg after a dwell time of 5 minutes.

Employed as a measure for hydrolysis resistance was the increase in the MVR measured according to ISO 1133 (2012 version) at 260° C. with an applied load of 5 kg after a storage of the granulate at 95° C. and 100% relative humidity for 7 days.

IZOD notched impact strength was determined at –30° C. according to ISO 180/1A (1982 version) on each of ten test specimens having dimensions of 80 mm×10 mm×4 mm.

The puncture test was conducted at –30° C. based on ISO 6603-2 (2000 version; "based on" means that no visual check of the test specimens was performed) on test specimens having dimensions of 60 mm×60 mm×2 mm.

Elongation at break was determined at room temperature according to ISO 527 (1996 version).

TABLE 1

Moulding materials and properties thereof

| Components [parts by weight] | 1 (comp.) | 2 comp. | 3 | 4 (comp.) |
|---|---|---|---|---|
| A | 70.0 | 70.0 | 70.0 | 70.0 |
| B | 30.0 | 30.0 | 30.0 | 30.0 |
| C-1 | — | 5.0 | — | — |
| C-2 | — | — | 5.0 | — |
| C-3 | — | — | — | 5.0 |
| D | 0.10 | 0.10 | 0.10 | 0.10 |
| E | 0.74 | 0.74 | 0.74 | 0.74 |
| Properties | | | | |
| Izod notched impact strength (−30° C.) [kJ/m$^2$] | 40 | 26 | 39 | 20 |
| Puncture test (−30° C.) Total energy [J] | 55 | 51 | 55 | 19 |
| Breaking elongation [%] | 111 | 110 | 102 | 76 |
| MVR (260° C./5 kg/ 5 min) [cm$^3$/10 min] | 19 | 23 | 23 | 23 |
| MVR [cm3/10 min] (after 7 days' storage, 95° C./100% rel. humidity; 260° C./5 kg/ 5 min) | 20 | 25 | 24 | 30 |
| MVR increase [%] | 5 | 9 | 4 | 30 |
| Melt viscosity [Pas] | 230 | 195 | 196 | 190 |
| Reduction in viscosity [%] | — | 15 | 15 | 17 |

It is apparent from table 1 that only the composition containing low molecular weight resins whose ratio of the integrated peak area of the FTIR spectrum in the wavenumber range 1630 cm-1 to 1560 cm-1 to the integrated peak area of the FTIR spectrum in the wavenumber range 1520 cm-1 to 1350 cm-1 is in the range from $(80-160) \cdot 10^{-3}$ solves the problem addressed by the invention, i.e. only the inventive composition according to example 3 (table 1) exhibits an improved flowability (lower melt viscosity, higher MVR without storage) while simultaneously retaining low-temperature toughness, hydrolysis resistance and high breaking elongation.

What is claimed is:

1. A composition for producing a thermoplastic moulding material, wherein the composition comprises the following components:
    A) aromatic polycarbonate or polyestercarbonate,
    B) rubber-modified vinyl (co)polymer,
    C) a hydrocarbon resin comprising aromatic and aliphatic structural units,
    D) optionally, further additives distinct from component C,
    wherein, for component C, the ratio of an integrated peak area of an FTIR spectrum in a wavenumber range of 1630 cm-1 to 1560 cm-1 to an integrated peak area of a FTIR spectrum in a wavenumber range of 1520 cm-1 to 1350 cm-1 is in a range from $(80-160) \cdot 10^{-3}$.

2. The composition according to claim 1, comprising
    4000 to 90% by weight of component A,
    5% to 50% by weight of component B,
    0.5% to 15% by weight of component C and
    0% to 20% by weight of component D.

3. The composition according to claim 1, wherein component A is bisphenol-A-based aromatic polycarbonate.

4. The composition according to claim 1, wherein component B contains rubber-modified graft polymer produced in bulk polymerization.

5. The composition according to claim 1, wherein component C has a weight-average molecular weight Mw of below 3000 g/mol.

6. The composition according to claim 1, wherein component C has a softening point according to ASTM E 28 of 80-115° C.

7. The composition according to claim 1, wherein, for component C, the ratio of the integrated peak area of the FTIR spectrum in the wavenumber range of 1630 cm-1 to 1560 cm-1 to the integrated peak area of the FTIR spectrum in the wavenumber range of 1520 cm-1 to 1350 cm-1 is in a range from $(100\text{-}130) \cdot 10^{-3}$.

8. The composition according to claim 1, wherein component C has a weight-average molecular weight Mw of below 1000 g/mol.

9. The composition according to claim 1, comprising
600% to 800% by weight of component A,
15% to 35% by weight of component B,
2% to 8% by weight of component C, and
0.2% to 10% by weight of component D.

10. The composition according to claim 1, comprising, as component D, at least one additive substance selected from the group consisting of flame retardants, anti-drip agents, flame retardant synergists, smoke inhibitors, lubricants and demoulding agents, nucleating agents, antistats, conductivity additives, stabilizers, flow promoters, compatibilizers, further impact modifiers distinct from component B, further polymeric blend partners, fillers and reinforcers, and dyes and pigments.

11. The composition according to claim 1, wherein the composition consists of components A), B), C), and D).

12. A process for producing a moulding material, comprising mixing the components of the composition according to claim 1 with one another at a temperature of 200° C. to 320° C.

13. A moulding material obtained or obtainable by the process according to claim 12.

14. A process for producing injection-moulded or thermoformed moulded articles, the process comprising utilizing the composition according claim 1.

15. A moulded article obtainable from a composition according to claim 1.

16. A process for producing injection-moulded or thermoformed moulded articles, the process comprising utilizing the moulding material according claim 13.

17. A moulded article obtainable from a moulding material according to claim 13.

* * * * *